United States Patent [19]

Horiki et al.

[11] Patent Number: 5,266,375
[45] Date of Patent: Nov. 30, 1993

[54] MASKING MEMBER

[75] Inventors: Seinosuke Horiki; Reiji Makino; Tetuji Unno, all of Tokai, Japan

[73] Assignee: Nagoya Oilchemical Co., Ltd., Nagoya, Japan

[21] Appl. No.: 876,901

[22] Filed: Apr. 30, 1992

Related U.S. Application Data

[63] Continuation of Ser. No. 617,498, Nov. 23, 1990, abandoned.

[30] Foreign Application Priority Data

Nov. 22, 1989 [JP] Japan .............. 1-136690[U]

[51] Int. Cl.⁵ .................... B05C 21/00; B05D 1/32
[52] U.S. Cl. .................... 428/131; 118/504; 118/505; 427/282; 428/119; 428/159; 428/167
[58] Field of Search .............. 118/504, 505, 301, 406; 427/143, 259, 282; 51/310, 312; 156/654, 658, 659.1, 660, 661.1; 428/158, 159, 167, 163, 119, 131

[56] References Cited

U.S. PATENT DOCUMENTS

| | | | |
|---|---|---|---|
| 4,366,941 | 1/1983 | Harris | 249/120 |
| 4,822,650 | 4/1989 | Horiki et al. | 118/505 |
| 4,835,026 | 5/1989 | Horiki et al. | 428/40 |
| 4,875,843 | 10/1989 | Onnenberg et al. | 425/388 |
| 4,879,156 | 11/1989 | Horiki et al. | 118/505 |
| 4,940,624 | 7/1990 | Horiki et al. | 428/159 |
| 4,973,234 | 11/1990 | Swenson | 425/117 |

FOREIGN PATENT DOCUMENTS

| | | |
|---|---|---|
| 249444 | 12/1987 | European Pat. Off. ......... 427/282 |
| 249508 | 12/1987 | European Pat. Off. . |
| 256782 | 2/1968 | European Pat. Off. . |
| 262946 | 4/1988 | European Pat. Off. . |
| 303268 | 2/1989 | European Pat. Off. . |
| 303270 | 2/1989 | European Pat. Off. . |
| 307932 | 3/1989 | European Pat. Off. . |

*Primary Examiner*—Khanh P. Nguyen
*Attorney, Agent, or Firm*—Cooper & Dunham

[57] ABSTRACT

A masking member consisting of a board having a projection shape on one side and a reinforcing groove on the other side, the depth of said groove being less than the thickness of said masking member.

5 Claims, 3 Drawing Sheets

MASKING MEMBER

This is a continuation of application Ser. No. 617,498, filed Nov. 23, 1990 now abandoned.

BACKGROUND OF THE INVENTION

The present invention relates to a masking member which protects a part of an article from a surface treatment. More particularly, the present invention relates to a masking member consisting of a board having projecting shape(s) on one side and a reinforcing groove on the other side wherein the depth of said groove is smaller than the thickness of said board.

Said masking member may be manufactured by such as the vacuum forming of a plastic board and then said vacuum formed board may be punched or trimmed to obtain said masking member. It is important for said punching or trimming that said masking member has a flat surface to avoid any gap between said vacuum formed board and the surface of the base when said vacuum formed board is punched or trimmed.

Further, when said masking member is used it is important that said masking member be closely attached to a part of the surface of an article to be protected from a surface treatment. Still further, said masking member should be reinforced to avoid deformation.

DESCRIPTION OF THE PRIOR ART

Hitherto, as shown in FIG. 6, a masking member (110) consisting of a board (101) having a pair of vessel-like projections (102), (102) and a reinforcing groove (103) on one side has been provided.

Said masking member may be manufactured by the vacuum forming of a thermoplastic sheet. When said masking member is used said masking member (110) is attached onto a part of the surface of an article (111) by inserting said projections (102), (102) into holes (112), (112) of said article (111) respectively to protect said part from a surface treatment, as shown in FIG. 7.

Since said reinforcing groove (103) projects on the other side of said board (101) of said masking member (110), when said vacuum formed board (101) is trimmed to obtain said masking member (110), said vacuum formed board (101) is put on a base (114) of a trimming machine and trimmed by trimming blades (113), (113) as shown in FIG. 8.

Nevertheless, due to said vacuum formed board (101) having a gap between the board and the surface of said base (114), it is difficult to trim said board (101) correctly. On the other hand, in the case that said reinforcing groove (103) is formed on the other side of said board (101), said reinforcing groove (103) projects on one side of said board (101) and when used, said masking member (110) may have a gap between said masking member and a part of the surface of an article. Accordingly, said part of the surface of said article cannot be completely protected by said masking member (110).

SUMMARY OF THE INVENTION

Accordingly, an object of the present invention is to reinforce a masking member by forming a reinforcing groove to avoid deformation of said masking member.

A further object of the present invention is to improve the workability when said masking member is punched or trimmed.

A still further object of the present invention is to protect completely a part of the surface of an article from a surface treatment using as a masking member.

According to the present invention, there is provided a masking member consisting of a board having projecting shape(s) on one side and a reinforcing groove on the other side wherein the depth of said groove is smaller than the thickness of said board.

BRIEF DESCRIPTION OF THE DRAWINGS

FIG. 1 is an underside perspective view of a masking member.

FIG. 2 is an upper side perspective view of said masking member.

FIG. 3 is a side sectional view of said masking member attached to a part of the surface of an article.

FIG. 4 is a side view showing a trimming process.

FIG. 6 is a perspective view of a masking member.

FIG. 7 is a side sectional view of a masking member attached to a part of the surface of an article.

FIG. 8 is a side view showing a trimming process.

DETAILED DESCRIPTION

FIG. 1 to FIG. 4 relate to an embodiment of the present invention.

Masking member (110)A consists of a board (101)A having a pair of vessel-like projections (102)A, (102)A on one side and a reinforcing groove (103)A on the other side wherein the depth of said groove (103)A is smaller than the thickness of said board (101)A.

Accordingly, said one side of said board (101)A of said masking member (110)A has no projection caused by said reinforcing groove (103)A.

Figure 1:
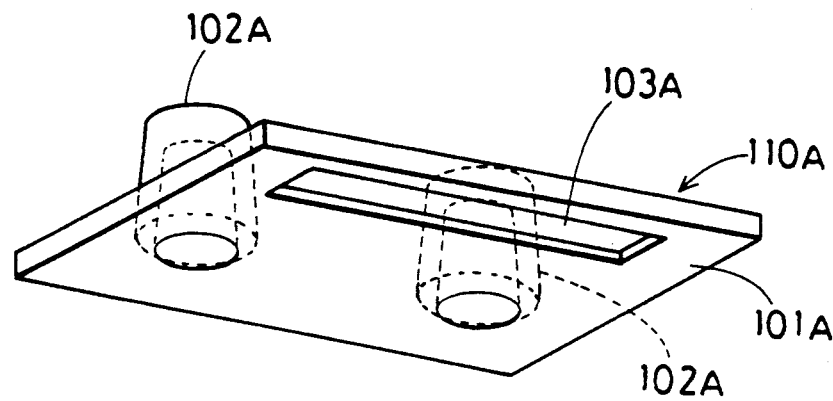
FIG. 1 to FIG. 4 relate to an embodiment of the present invention.
Figure 2:
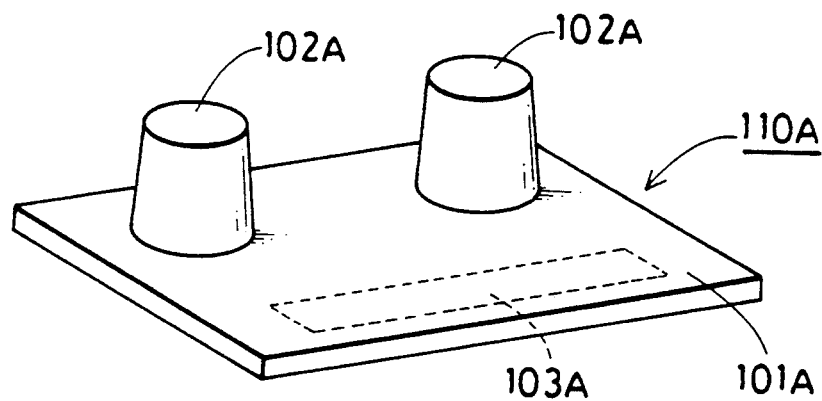
Figure 3:
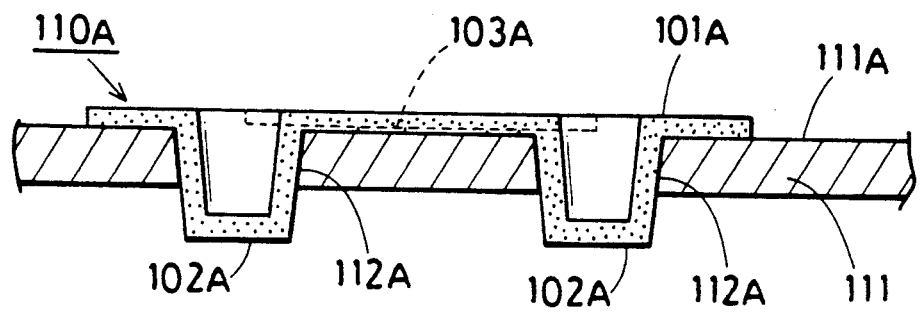

As above described, said masking member (110)A is reinforced by said reinforcing groove (103)A to prevent deformation and as shown in FIG. 3, said masking member (110)A is attached onto part of the surface (111)A of an article (111) by inserting said vessel-like projections (102)A, (102)A into a pair of holes (112)A, (112)A of said article (111) respectively.

Said masking member (110)A is closely attached onto said part of the surface (111)A of an article (111) since said one side of said board (101)A of said masking member (110)A has no projection as above described and said part of the surface (111)A of an article (111) is completely protected from a surface treatment by said masking member (110)A.

Masking member (110)A may be manufactured by the vacuum forming or the press molding of a plastic sheet such as polystyrene sheet, polyethylene sheet, polypropylene sheet, polyurethane sheet, and the like or a foamed plastic sheet, such as afoamed polystyrene sheet, foamed polyethylene sheet, foamed polypropylene sheet, foamed polyurethane sheet, and the like, or said masking member (110)A may be manufactured by the expansion molding of expandable beads such as expandable polystyrene beads, expandable polyethylene beads, expandable polypropylene beads, and the like, or said masking member (110)A may be manufactured by injection molding by plastic pellets, such as polystyrene pellets, polyethylene pellets, polypropylene pellets, and the like. A fiber material such as a paste-board, non-woven fabric, cloth, knitting, and the like, metal, and the like may also be used as a material of said masking member (110)A.

It is desirable for reinforcing said masking member (110)A that the depth of said reinforcing groove (103)A of said masking member (110)A is more than 0.1 mm and accordingly it is desirable that the thickness of said board (101)A of said masking member (110)A is more than 0.2 mm. Nevertheless, to save material for said masking member (110)A it is desirable that the thickness of said board (101)A be less than 10 mm.

As above described, said masking member (101)A is molded and after then said masking member (110)A is trimmed into the desired shape and to the desired size.

Figure 4:
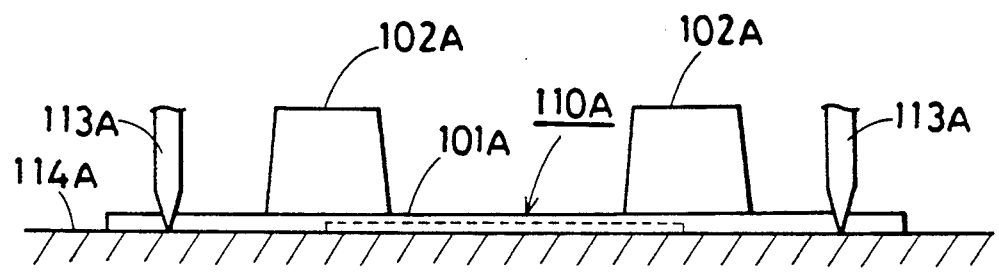

In said trimming process said masking member (110)A is put on the base (114)A of a trimming machine and trimmed by trimming blades (113)A, (113)A as shown in FIG. 4.

When said masking member (110)A is trimmed as above described, said masking member (110)A is put on the base (114)A of the trimming machine in the trimming process, and said masking member (110)A has no gap between the masking member and the surface of said base (114)A. Accordingly, an improved workability is obtained in said trimming process and said masking member (110)A is correctly and easily trimmed by said trimming blades (113)A.

Figure 5:
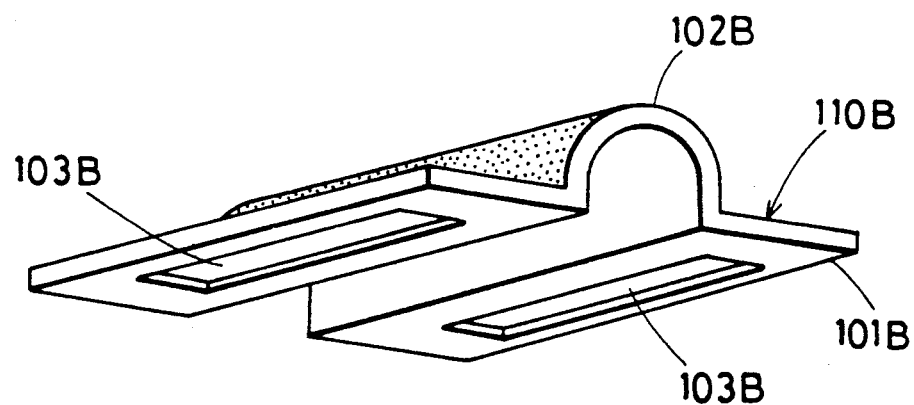
FIG. 5 is a perspective view of another embodiment of the present invention.
Figure 6:
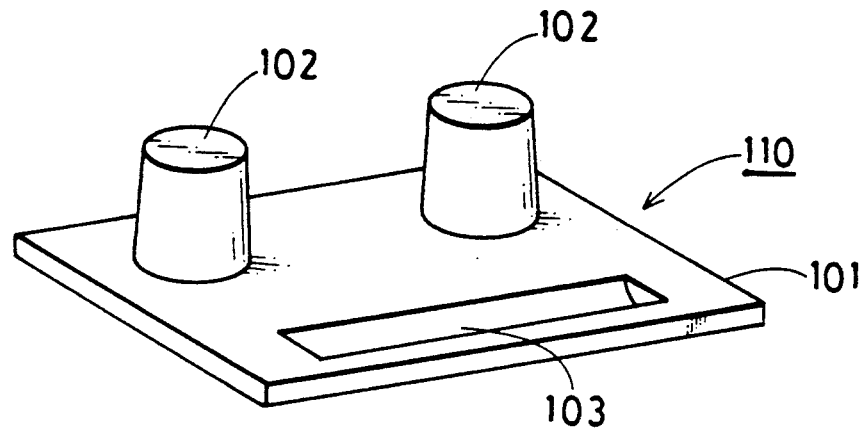
FIG. 6 to FIG. 8 relate to the prior art.
Figure 7:
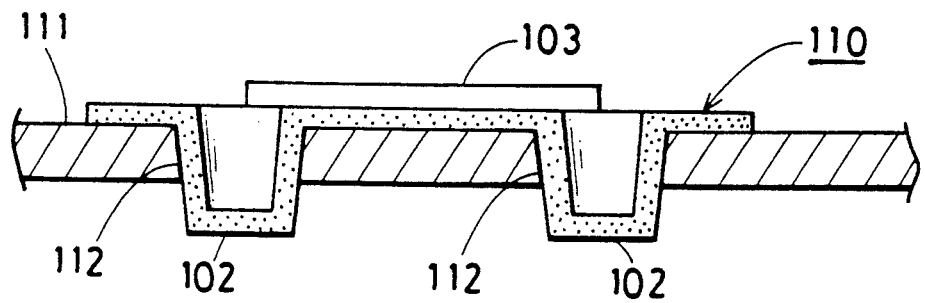
Figure 8:
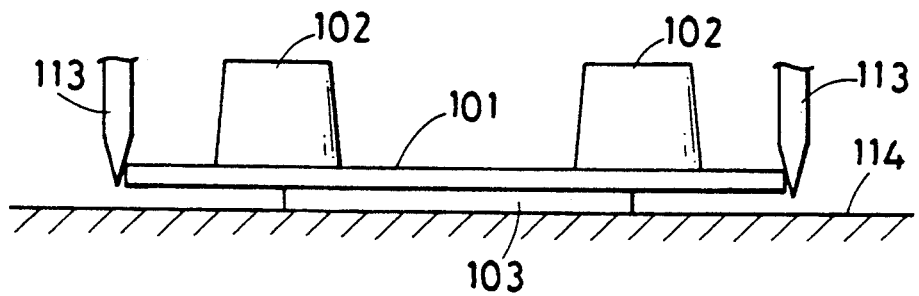

FIG. 5 relates to another embodiment of the present invention.

Referring now to FIG. 5, a back-bone part (102)B is formed on one side of a floor carpet (110)B of an automobile and said back-bone part (102)B has a projecting shape corresponding to the shape of the floor of said automobile. Further, a reinforcing groove (103)B is formed on the other side of said floor carpet (110)B and the depth of said reinforcing groove (103)B is smaller than the thickness of said floor carpet (110)B. Accordingly, both sides of said floor carpet (110)B have a flat surface and said floor carpet (110)B has a preferable appearance and is closely attached to the floor of the automobile and further said floor carpet (110)B is easily trimmed after molding.

We claim:

1. A masking member consisting of a board having a projection on one side and a reinforcing groove formed on the other side of the board having a depth smaller than the thickness of said board and extending only along part of the length of the other side of said board and ending before the edges thereof, whereby said masking member is attachable to a part of an article to be protected employing said masking member by inserting said projection into a hole or cavity provided on said part of said article to be protected and whereby said reinforcing groove serves to reinforce said board against deformation.

2. A masking member in accordance with claim 1 wherein said masking member comprises a plastic sheet.

3. A masking member in accordance with claim 1 wherein said masking member comprises foamed plastic sheet.

4. A masking member in accordance with claim 1 wherein said member comprises a polyolefin plastic.

5. A masking member in accordance with claim 4 wherein said polyolefin plastic is polypropylene.

* * * * *